United States Patent
Engelbart et al.

(10) Patent No.: US 7,435,947 B2
(45) Date of Patent: Oct. 14, 2008

(54) APPARATUS AND METHODS FOR INTEGRATING ENCODING FUNCTIONS IN MATERIAL PLACEMENT MACHINES

(75) Inventors: Roger W. Engelbart, St. Louis, MO (US); Reed Hannebaum, Belleville, IL (US); Jeff Putnam, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/264,077

(22) Filed: Oct. 31, 2005

(65) Prior Publication Data

US 2007/0096019 A1    May 3, 2007

(51) Int. Cl.
G01D 5/34 (2006.01)
G01N 21/86 (2006.01)
(52) U.S. Cl. .............................. 250/231.15; 250/559.01
(58) Field of Classification Search ............ 250/559.01, 250/559.29, 231.15, 559.04, 559.05; 156/574; 356/237.1, 237.2
See application file for complete search history.

(56) References Cited

U.S. PATENT DOCUMENTS

| | | | |
|---|---|---|---|
| 3,879,245 A | 4/1975 | Fetherson et al. | |
| 4,064,534 A | 12/1977 | Chen et al. | |
| 4,310,132 A | 1/1982 | Frosch et al. | |
| 4,548,859 A | 10/1985 | Kline et al. | |
| 4,608,220 A | 8/1986 | Caldwell et al. | |
| 4,693,678 A | 9/1987 | Von Volkli | |
| 4,699,683 A * | 10/1987 | McCowin | 156/353 |
| 4,760,444 A | 7/1988 | Nielson et al. | |
| 4,780,262 A | 10/1988 | Von Volkli | |
| 4,790,898 A | 12/1988 | Woods | |
| 4,830,298 A | 5/1989 | Van Blunk | |
| 4,877,471 A | 10/1989 | McCowin et al. | |
| 4,941,182 A | 7/1990 | Patel | |
| 5,024,399 A | 6/1991 | Barquet et al. | |
| 5,058,497 A | 10/1991 | Bishop et al. | |

(Continued)

FOREIGN PATENT DOCUMENTS

EP    0 319 797 A2    6/1989

(Continued)

OTHER PUBLICATIONS

U.S. Appl No. 10/628,691, filed Jul. 28, 2003, Engelbart et al., entitled Systems and Methods for Identifying Foreign Objects and Debris (FOD) and Defects During Fabrication of a Composite Structure.

(Continued)

Primary Examiner—Thanh X Luu
(74) Attorney, Agent, or Firm—Harness, Dickey & Pierce, P.L.C.

(57) ABSTRACT

A method of providing input to an inspection system for inspecting material laid by a composite material placement machine. A placement machine component that drives a first encoder output is used to drive a second encoder output. The second encoder output is used to trigger image acquisition by the inspection system. Existing components can be used to provide encoding capability for a placement machine inspection system. Because encoder output signals for material placement and for material inspection are driven by the same component, material placement locations can be determined more precisely compared with other methods.

23 Claims, 5 Drawing Sheets

U.S. PATENT DOCUMENTS

| | | | |
|---|---|---|---|
| 5,198,983 | A | 3/1993 | Blake et al. |
| 5,337,647 | A | 8/1994 | Roberts et al. |
| 5,439,549 | A | 8/1995 | Fryc et al. |
| 5,450,147 | A | 9/1995 | Dorsey-Palmateer |
| 5,518,208 | A | 5/1996 | Roseburg |
| 5,540,126 | A | 7/1996 | Piramoon |
| 5,562,788 | A * | 10/1996 | Kitson et al. .................. 156/64 |
| 5,651,600 | A | 7/1997 | Dorsey-Palmateer |
| 5,683,646 | A | 11/1997 | Reilling, Jr. |
| 5,700,337 | A | 12/1997 | Jacobs et al. |
| 5,746,553 | A | 5/1998 | Engwall |
| 5,804,276 | A | 9/1998 | Jacobs et al. |
| 5,814,386 | A | 9/1998 | Vasiliev et al. |
| 5,825,495 | A | 10/1998 | Huber |
| 5,871,117 | A | 2/1999 | Protasov et al. |
| 5,917,588 | A | 6/1999 | Addiego |
| 5,963,660 | A | 10/1999 | Koontz et al. |
| 5,979,531 | A | 11/1999 | Barr et al. |
| 6,012,883 | A | 1/2000 | Engwall et al. |
| 6,013,341 | A | 1/2000 | Medvedev et al. |
| 6,026,883 | A * | 2/2000 | Hegerhorst et al. ......... 156/441 |
| 6,045,651 | A | 4/2000 | Kline et al. |
| 6,074,716 | A | 6/2000 | Tsotsis |
| 6,086,696 | A | 7/2000 | Gallagher |
| 6,087,654 | A * | 7/2000 | Durham, III ........... 250/231.13 |
| 6,112,792 | A | 9/2000 | Barr et al. |
| 6,168,358 | B1 | 1/2001 | Engwall et al. |
| 6,205,239 | B1 | 3/2001 | Lin et al. |
| 6,229,972 | B1 * | 5/2001 | Rushing ...................... 399/74 |
| 6,364,250 | B1 | 4/2002 | Brinck et al. |
| 6,369,492 | B1 | 4/2002 | Sugimoto |
| 6,390,169 | B1 | 5/2002 | Johnson |
| 6,451,152 | B1 | 9/2002 | Holmes et al. |
| 6,453,962 | B1 * | 9/2002 | Pratt .......................... 156/351 |
| 6,480,271 | B1 | 11/2002 | Cloud et al. |
| 6,542,235 | B1 * | 4/2003 | Caskey et al. ............... 356/394 |
| 6,547,769 | B2 | 4/2003 | Van Tassel et al. |
| 6,639,662 | B2 | 10/2003 | Vaez-Iravani et al. |
| 6,648,273 | B2 | 11/2003 | Anast |
| 6,692,681 | B1 | 2/2004 | Lunde |
| 6,725,123 | B1 | 4/2004 | Denuell |
| 6,799,619 | B2 | 10/2004 | Holmes et al. |
| 6,814,822 | B2 | 11/2004 | Holmes et al. |
| 6,871,684 | B2 | 3/2005 | Engelbart et al. |
| 2002/0141632 | A1 | 10/2002 | Engelbart et al. |
| 2004/0098852 | A1 | 5/2004 | Nelson |
| 2005/0023414 | A1 | 2/2005 | Braun |
| 2005/0025350 | A1 | 2/2005 | Engelbart et al. |
| 2005/0039842 | A1 | 2/2005 | Clark |
| 2005/0039843 | A1 | 2/2005 | Johnson et al. |
| 2005/0039844 | A1 | 2/2005 | Engwall et al. |
| 2005/0102814 | A1 | 5/2005 | Anderson et al. |
| 2005/0117793 | A1 | 6/2005 | Engelbart et al. |
| 2005/0203657 | A1 | 9/2005 | Engelbart et al. |
| 2005/0225753 | A1 | 10/2005 | Engelbart et al. |
| 2005/0263645 | A1 | 12/2005 | Johnson et al. |

FOREIGN PATENT DOCUMENTS

| | | |
|---|---|---|
| EP | 0 903 574 | 3/1994 |
| EP | 0 833 146 A2 | 1/1998 |
| EP | 1 030 172 | 8/2000 |
| JP | 2001012930 | 1/2001 |
| WO | WO 94/18643 | 8/1994 |
| WO | WO 2004/025385 | 3/2004 |

OTHER PUBLICATIONS

U.S. Appl. No. 10/819,084, Turnmire et al.
U.S. Appl. No. 60/559,890, filed Apr. 6, 2004, Biornstad et al.
U.S. Appl. No. 60/559,911, filed Apr. 4, 2004, Johnson et al.
Pending U.S. Appl. No. 10/949,848, filed Sep. 23, 2004, Stulc.
Krupka, R; Walz, T; Ettemeyer, A: "Industrial Applications of Shearography for Inspection of Aircraft Components" Proceedings of the 8th European Conference of Nondestructive Testing< Barcelona (Spain), Jun. 17-21, 2002, 'Online! Jun. 30, 2002, XP002351899 ndt.net-Feb. 2003, vol. 8, No. 2 Retrieved from the Internet: URL:http://www.ndt.net/articl/ecndt02/484/484.htm> 'retrieved on Oct. 31, 2005!.
The Written Opinion for International Application PCT/US2004/039905, dated May 25, 2005, 6 pages.
International Search Report dated May 25, 2005 for report for International Application PCT/US2004/039905, dated Nov. 30, 2004, 4 pages.
Prof. J. Zhang: "Angewandte Sensorik" Ch. 4, Sensoren in der Robotik, Nov. 11, 2003; (retrieved from the Internet, URL:http://tech-www. Informatik.uni-hamburgnsorik/vorlesung_03.pdf) retrieved on Apr. 2004! p. 89, 20 pages.
European Search Report, Application No. 04076900.2, dated Dec. 1, 2004, 4 pages.
Fiedler, L., et al, "Tango Composite Fuselage Platform", SAMPE Journal, vol. 39, No. 1, Jan./Feb. 2003, pp. 57-63.
Advanced Technology Tape Laying for Affordable Manufacturing of Large Composite Structures; http://www.cinmach.com/tech/pdf/TapeLayingGrimshaw.pdf; Michael N. Grimshaw, et al; 11 pages.
Fiber Placement; http://www.cinmach.com/tech/pdf/asm_chapter_fp.pdf; Don O. Evans; Cincinnati Machine; 3 pages.
Automated Tape Laying; http://www.cinmach.com/tech/pdf/Grimshaw%20ASM%20Handbook.pdf; Michael N. Grimshaw; Cincinnati Machine; 6 pages.
Raytheon Aircraft's Hawker Horizon Reaches Fuselage Milestone, Raytheon News Release; http://www.beechcraft.de/Presse/2000/100900b.htm; 2 pages.
BAe 146, Flight International, May 2, 1981, 2 pages.
A Barrelful of Experience, Intervia, May 1992, 2 pages.
Raytheon, Mar. 2000, vol. 4, No. 2, http://www.cts.com/king/vasci/newsletter/vol42.html, 2 pages.
Business Aviation, Jun. 7, 2002, http://www.aviationnow.com/avnow/news/channel_busav.jsp?view=story&id=news/btoyo0607.xml, 1 page.
Beechcraft's Composite Challenge, http://www.aerotalk.com/Beech.cfm, 2 pages.
Sharp et al., "Material Selection/Fabrication Issues for Thermoplastic Fiber Placement", Journal of Thermosplastic Composite Materials, vol. 8; Jan. 1995, pp. 2-14.
http://www.cinmach.com/WolfTracks4-1/MTG-WT7.htm; Premier I Features Lighter, Stronger, All-Composite Fuselage, 1 page.
htpp://www.cinmach.com/compnews/PressReleases/pr00-11.htm; Raytheon Aircraft Orders Four More FIber Cincinnati Fiber Placement Systems for Industry's First Composite-Fuselage Business Jets, 1 page.
htpp://www.rockymountaincomposites.com/wind-sys.htm: Filament Winding, 2 pages.

* cited by examiner

APPARATUS AND METHODS FOR INTEGRATING ENCODING FUNCTIONS IN MATERIAL PLACEMENT MACHINES

FIELD OF THE INVENTION

The present invention relates generally to automated material placement machines and their use. More particularly, but not exclusively, the present invention relates to systems and methods for inspecting material laid by an automated material placement machine.

BACKGROUND OF THE INVENTION

Automated material placement is widely used in aerospace and other industries in the fabrication of large composite structures. A variety of placement processes and machines are used for rapid placement of composite material. It is desirable for such machines to have in-process inspection capabilities to assure consistent quality without impacting machine operation. As new and/or improved inspection capabilities are added to material placement machines, it is desirable to minimize the number of new components to be added to implement new or improved features. Accordingly, it can be desirable to use existing machine components when incorporating new or improved features in a machine.

SUMMARY OF THE INVENTION

The present invention, in one aspect, is directed to a method of providing input to an inspection system for inspecting material laid by a material placement machine on a substrate to form a composite structure. A placement machine component that drives a first encoder output is used to drive a second encoder output. The second encoder output is used to trigger image acquisition by the inspection system.

In another aspect, the invention is directed to an inspection system for inspecting material laid by a material placement machine on a substrate to form a composite structure. The inspection system includes a placement machine component that drives first and second encoder outputs. An encoder is coupled to the placement machine component. The encoder provides at least the first encoder output. The second encoder output is used to trigger image acquisition by the inspection system.

In yet another aspect, the invention is directed to an inspection system for inspecting material laid by a material placement machine on a substrate to form a composite structure. The inspection system includes one or more cameras configured to acquire images of the laid material. The inspection system includes an encoder that provides at least a first encoder output to track a length of material feed during movement of the machine. A roller drives the encoder and drives a second encoder output. The second encoder output is used for triggering image acquisition by the one or more cameras.

Further areas of applicability of the present invention will become apparent from the detailed description provided hereinafter. It should be understood that the detailed description and specific examples, while indicating various preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF EMBODIMENTS

The following description of various embodiments is merely exemplary in nature and is in no way intended to limit the invention, its application, or uses. Although various implementations of the invention are discussed with reference to an add roller of a fiber placement (FP) machine, the invention is not so limited. Implementations also are contemplated for use in connection with various types of material placement machines, including but not limited to contour tape lamination (CTL) machines and multi-head tape lamination machines (MHTLM). Additionally, material placement machine components other than or in addition to add rollers could be used to provide encoder output(s) in various embodiments.

Figure 1:
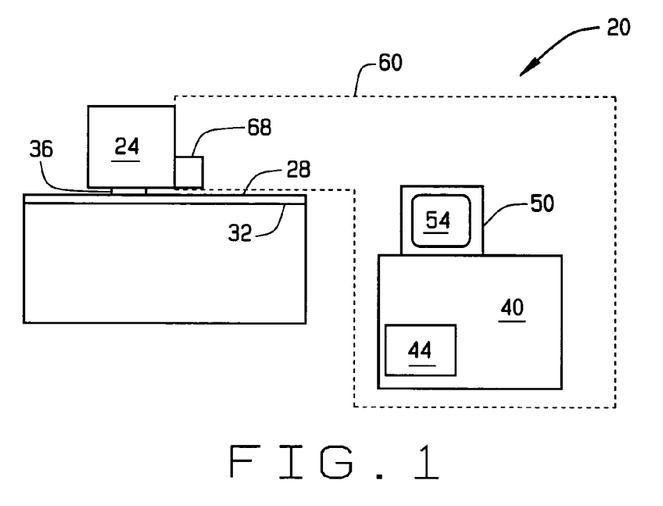
FIG. 1 is a block diagram of an exemplary material placement machine.

A simplified block diagram of an exemplary material placement system is indicated generally in FIG. 1 by reference number 20. A material placement machine 24 is used to lay down composite material 28 onto a substrate 32 to fabricate a composite structure. The machine 24 includes a roller, compaction shoe and/or other component, numbered as 36 and dependent on the type of placement machine, for laying the material 28 onto the substrate 32. The system 20 includes a processor 40 having a memory and/or storage device 44. The processor 40 is in communication with the machine 24. A user interface 50 may be, e.g., a computer monitor including a display screen 54 and an input device such as a keyboard and mouse (not shown). The user interface 50 is in communication with the processor 40. An inspection system 60 uses a vision system 68 to inspect newly laid material for defects.

When the machine 24 is in operation, the processor 40 may actuate one or more cameras (not shown) of the vision system 68 to obtain images at appropriate times based on movement of the machine 24. The camera(s) obtain images of material newly placed on the substrate 32. The processor 40 receives each image and assigns unique numbers to frames of the image data. The processor 40 stores image frames in the memory 44 and uses them to track a linear position of the machine 24 as material is placed on the substrate 32. The processor 40 processes the image data in a frame to detect defects in the imaged section of material 28. The processor 40 also analyzes and displays selected defects on the user interface 50.

In various types of material placement machines, an encoder (not shown in FIG. 1) may be used to track forward motion of a machine while material is being laid. Linear distance traveled by the machine may be used to trigger acquisition of images by an inspection system camera. A number of revolutions of the encoder is designated as equivalent to a specific linear distance traveled by the machine. This distance may also equal the height of a frame or rectangular image to be covered by the camera field of view.

Figure 2:
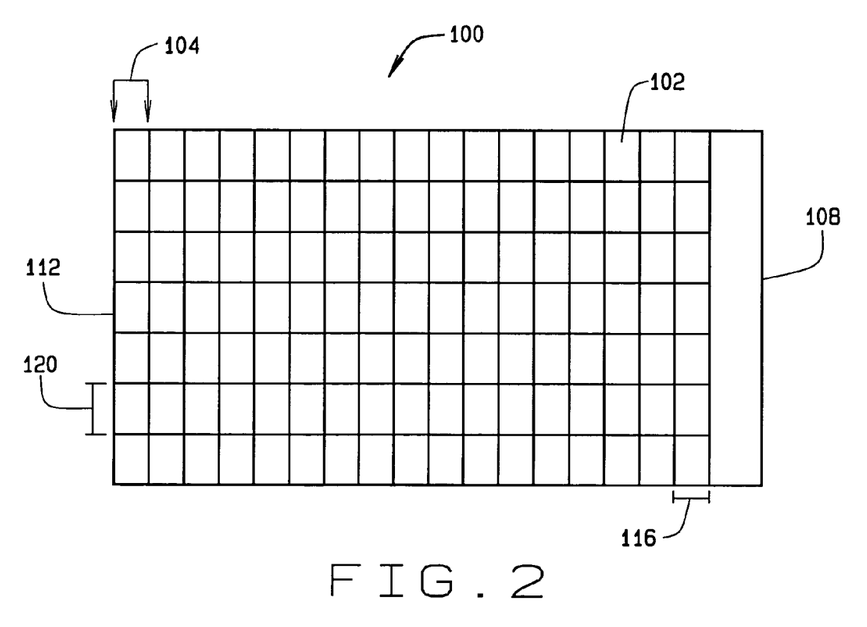
FIG. 2 is a schematic view of an exemplary composite structure on which frames derived from encoder revolutions are indicated.

FIG. 2 is a schematic view of an exemplary composite structure 100 on which frames 102 derived from revolutions of a material placement machine encoder are shown. The composite structure 100 includes a plurality of adjacent courses 104 of composite material. The courses 104 typically include a plurality of fibers embedded in a resin or other material that becomes tacky or flowable upon the application of heat. The courses 104 are arranged on a work surface, such as a table, mandrel, or other tool, and compacted, e.g., with a compaction roller or compaction shoe to form a ply 108. As shown in FIG. 2, a ply 112 being laid is to include eighteen courses 104, sixteen of which have been completed by the material placement machine. That is, the material placement machine has made sixteen passes across a substrate, which in the present example is the ply 108. During each of the passes, the material placement machine has laid down a course 104 on the substrate.

A frame width 116 equals the width of a material course 104 being laid, whether fiber tows or tape. Frame height 120 is a fixed value and can be used as a means to determine linear distance traveled, and of locating flaws or areas of interest on the laminate ply 112. The completion of a linear distance equal to frame height 120 may be communicated to an inspection system through signal pulses from the encoder. An entire laminate may be effectively subdivided into frames 102, each of which is assigned a discrete number. Frame size and frame number can be used to locate flaws and defective regions on the laminate.

When a defect is detected, a signal can be produced that not only may indicate defect detection but also may trigger measurement and marking of the defect. Exemplary systems and methods capable of detecting defects in a composite structure are described in U.S. patent application Ser. No. 09/819,922, filed Mar. 28, 2001, entitled "System and Method for Identifying Defects in a Composite Structure"; U.S. Pat. No. 6,871,684 issued Mar. 29, 2005, entitled "System for Identifying Defects in a Composite Structure"; and U.S. patent application Ser. No. 10/628,691, filed Jul. 28, 2003, entitled "Systems and Methods for Identifying Foreign Objects and Debris (FOD) and Defects During Fabrication of a Composite Structure." The entire disclosures of U.S. patent application Ser. Nos. 09/819,922, 10/217,805, and 10/628,691 are each incorporated herein by reference as if fully set forth herein.

The present invention, in some aspects, is directed to providing information to a placement machine inspection system via an encoder. In various implementations, a placement machine component that drives encoder output for other purpose(s) is used to drive an encoder output for use in an inspection system.

In some implementations, the invention is directed to a method of providing input to an inspection system for inspecting material laid by a material placement machine. A placement machine component that drives a first encoder output is used to drive a second encoder output. The second encoder output is used to trigger image acquisition, e.g., by a camera of the inspection system. In some implementations, an in-process inspection system may utilize output of an existing material placement machine encoder. In other implementations, a second encoder may be mounted on or otherwise coupled to a placement machine component that drives a first encoder.

Figure 3:
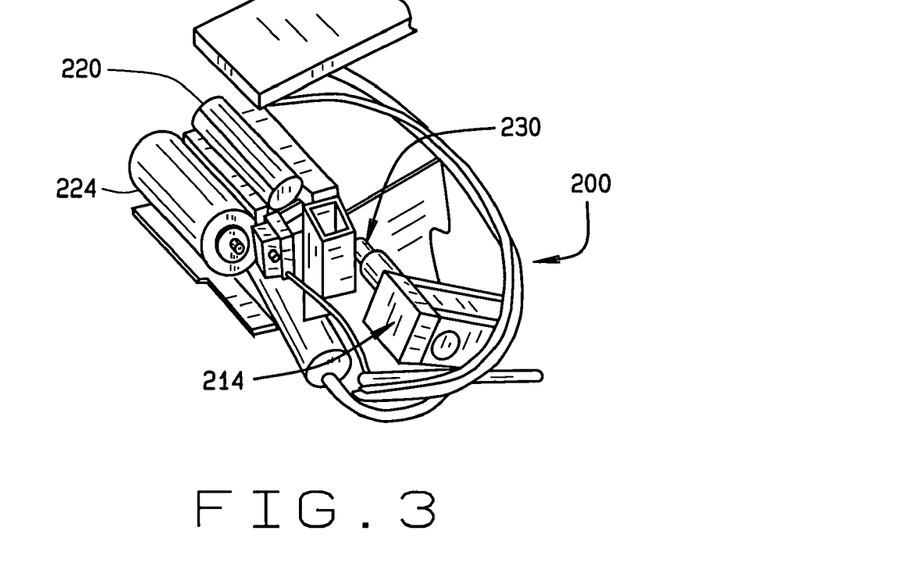
FIG. 3 is a right side perspective partial view of a fiber placement machine configured in accordance with one implementation of the invention.
Figure 4:
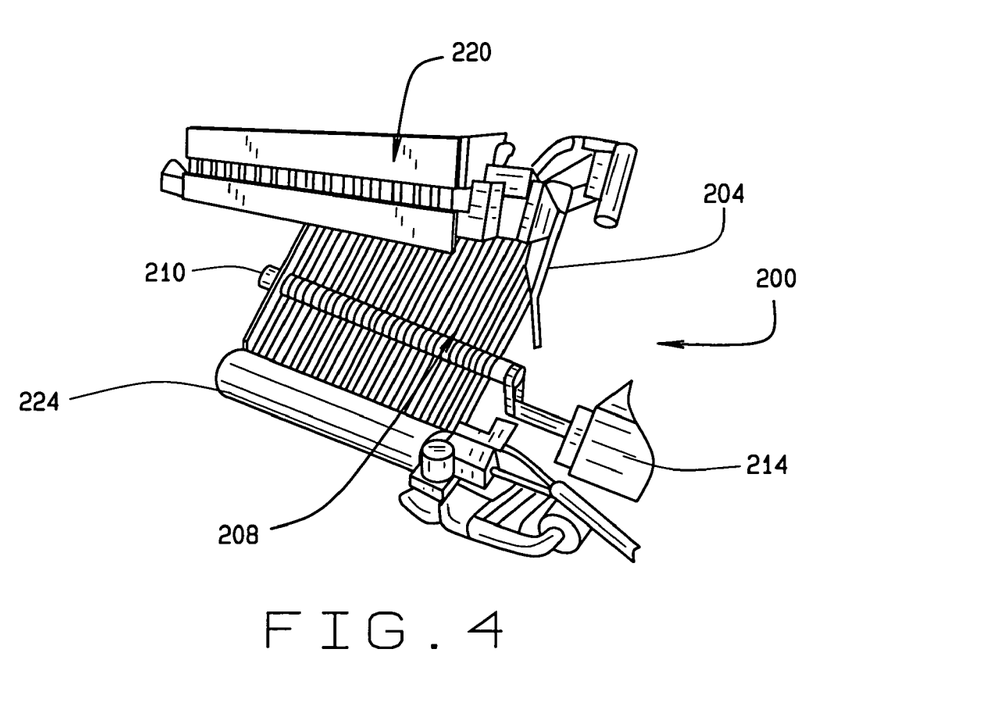
FIG. 4 is a rear perspective partial view of a fiber placement machine configured in accordance with one implementation of the invention.
Figure 5:
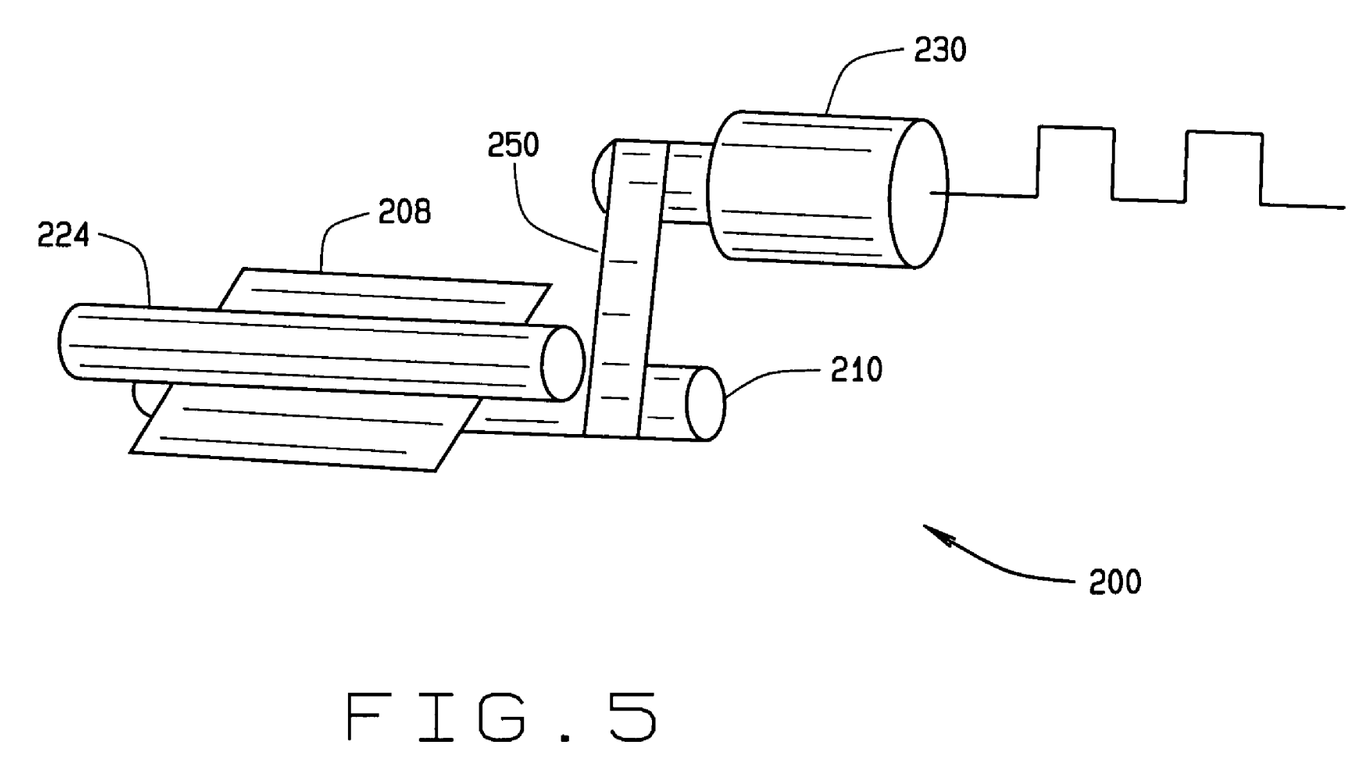
FIG. 5 is a diagram of an encoder coupled to an add roller in accordance with one implementation of the invention.

A material placement machine configured in accordance with one aspect of the invention is partially shown and indicated generally in FIGS. 3-5 by reference number 200. The machine 200 is a fiber placement (FP) machine having a fiber placement head 204. The placement head 204 is configured to handle thirty-two 0.25-inch wide fiber tows 208 for a total bandwidth of eight inches. An "add" roller 210 defining a U-axis of the machine 200 is associated with the placement of fiber tow material during normal operation of the machine. A servo motor 214 is used to drive the "add" roller 210. As fiber tows pass through a cutter assembly 220, they are pressed against the add roller 210 and fed out toward a compaction roller 224.

A rotary encoder mounted on or otherwise coupled to the add roller 210 is used to track length of material feed during movement of the placement machine 200. One such encoder is indicated in FIGS. 3 and 5 by reference number 230. The encoder 230 is coupled to the add roller 210, e.g., by a cogged belt 250 having a 4:1 gear ratio. The encoder 230 is, e.g., a ROD 1080 3600 encoder by Heidenhain Corporation of Schaumburg, Ill.

The encoder 230 generates pulses at a higher rate than needed for activating image acquisition by a placement machine inspection system. Additionally, the encoder 230 operates at a single TTL (transistor-transistor logic) load. More specifically and in some embodiments, a pair of transistors (not shown) of the encoder circuitry operate as an on-off switch to generate pulses indicating placement machine travel. The TTL load is the maximum current that can be driven through the switch that still allows the switch to reach operating voltage. Thus the encoder 230 provides only a single output for use in the placement machine 200.

Figure 6:
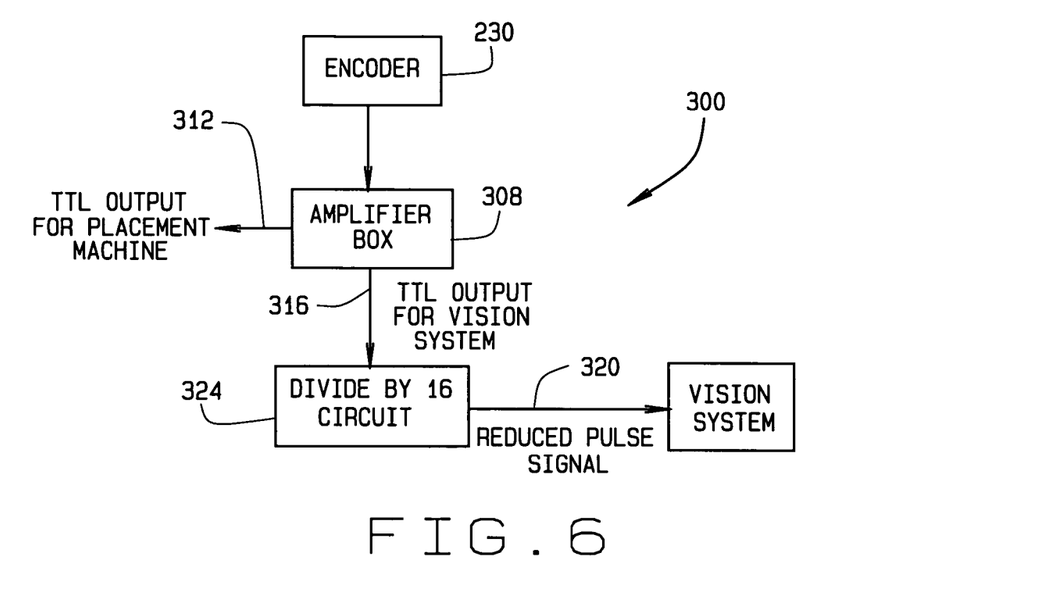
FIG. 6 is a block diagram of an encoder configuration in accordance with one implementation of the invention.

Accordingly, to provide more than one encoder output, the encoder 230 may be included in an exemplary configuration indicated generally in FIG. 6 by reference number 300. The encoder 230 is connected with an amplifier circuit 308. The amplifier circuit 308 can generate two TTL outputs 312 and 316. Thus the amplifier circuit 308 can be used to provide a first encoder output 312 for use by the placement machine 200 to track material feed length, and a second encoder output 320 for use by the inspection system to key image acquisition.

Where it is desired to use a different pulse rate from one generated by an encoder, a divider circuit may be used. For example, a divider circuit 324 receives the amplified encoder signal 316 and divides it by an integer, preferably sixteen, which lowers a pulse rate from the encoder 230 to about 4851 pulses per second with a linear accuracy of about 0.004 inch per pulse. The amplifier circuit 308 is, e.g., an IBV606 amplifier box from Heidenhain Corporation. The first encoder output 312 provided by the configuration 300 to the placement machine 200 for tracking material feed length is essentially the same as the single TTL output provided by the encoder 230 in the absence of the amplifier and divider circuits 308 and 324.

Depending on a type and make of placement machine, configuring an encoder as shown in FIG. 6 may entail the replacement of a previously provided encoder. For example, in one configuration of the placement machine 200, a Heidenhain rotary encoder ROD 1020 3600 02S12-03, coupled to the roller 210 with a cogged belt having a 4:1 gear ratio, is provided by the machine manufacturer. It may be desirable to provide another (e.g., a second) encoder output to an inspection system without replacing a previously provided encoder. It may also be desirable to provide yet another (e.g., a third)

encoder output for yet another use. Additionally or alternatively to the implementation illustrated in FIG. 6, another encoder output may be provided, for example, by adding another encoder to the machine 200.

Figure 7:
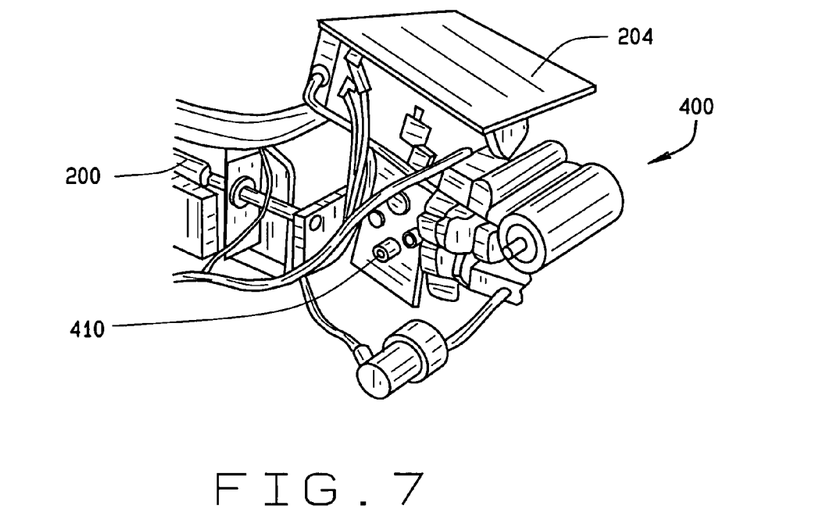
FIG. 7 is a left perspective partial view of a fiber placement machine configured in accordance with one implementation of the invention.
Figure 8:
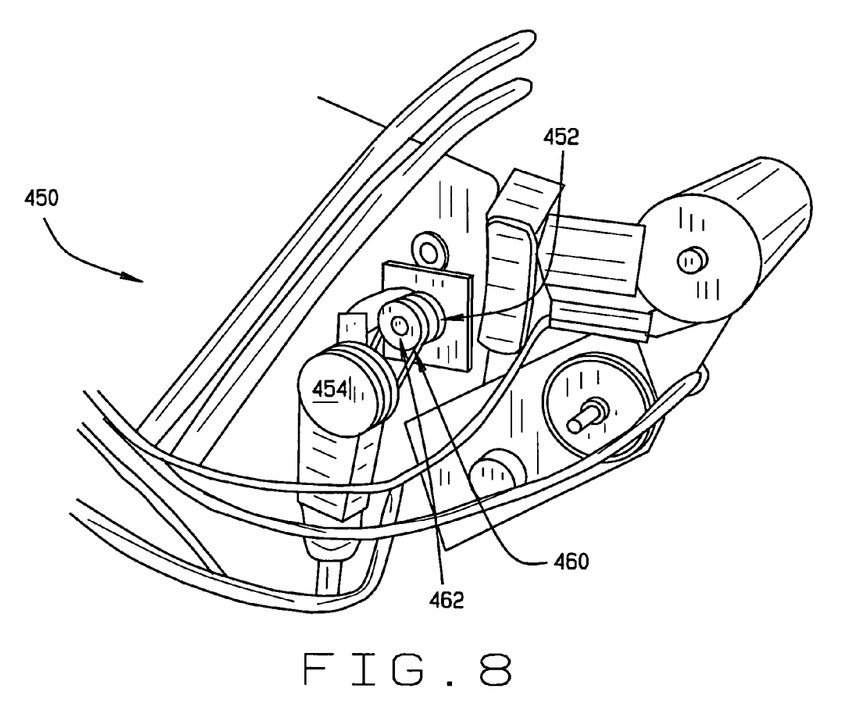
FIG. 8 is a left perspective partial view of a fiber placement machine configured in accordance with one implementation of the invention.

Another exemplary configuration of the placement machine 200 is indicated generally in FIG. 7 by reference number 400. A knurled knob 410 on an end of the add roller 210 provides a means of manually advancing the fiber tow material 208, e.g., for maintenance and cleaning purposes. Removal of the knob 410 provides a location at an end of the roller 210 for attachment of another, e.g., a second, encoder. One configuration of a material placement machine including two encoders is indicated generally in FIG. 8 by reference number 450. A first encoder (not visible) is coupled to one end (not visible) of an add roller 452. A second encoder 454 is coupled to the other end 458 of the roller 452 by a belt 460 and drive pulley 462 mounted on the roller. In such manner, an encoder output for the inspection system can be obtained without placement machine modifications or part substitutions.

Figure 9:
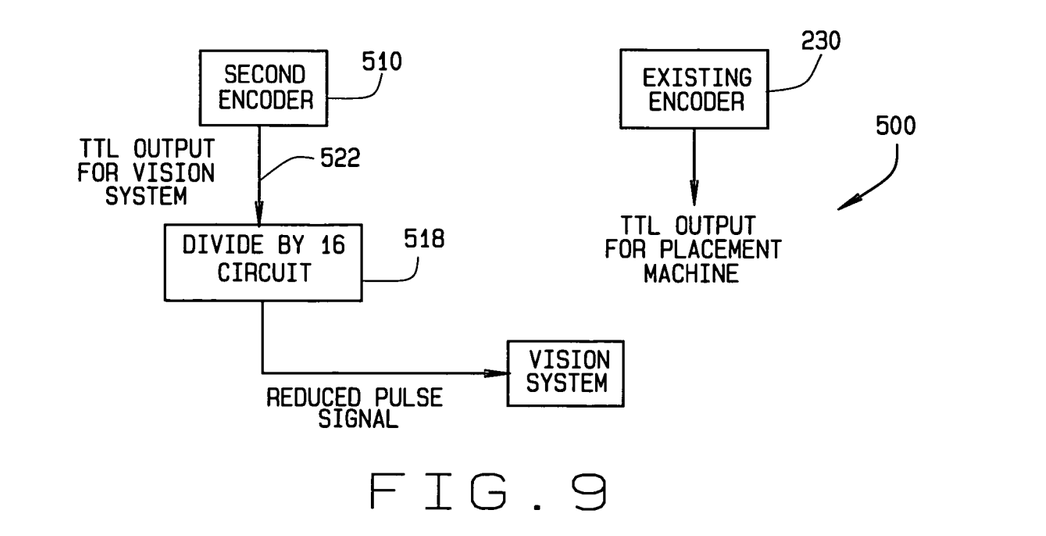
FIG. 9 is a block diagram of an encoder configuration in accordance with one implementation of the invention.

A configuration including a second encoder is indicated generally in FIG. 9 by reference number 500. If desired, the previously provided encoder 230 may be dedicated to the placement machine inspection system. Accordingly, a second encoder 510 is connected with a divider circuit 518. No amplifier circuit need be used. The divider circuit 518 receives a signal 522 from the encoder 510 and divides it by an integer, preferably sixteen, which lowers a pulse rate from the encoder 510 to about 4851 pulses per second with a linear accuracy of about 0.004 inch per pulse. In another configuration in which another device uses an output of the encoder 510, an amplifier circuit may be connected between the encoder 510 and the divider circuit 518 as previously described with reference to FIG. 6.

The foregoing methods and apparatus make use of existing placement machine features and components to provide encoding capability for a placement machine inspection system. Thus the number, complexity and weight of hardware components associated with the inspection systems that must be added to the overall system can be reduced or eliminated. Because encoder output signals for the placement process and for material inspection are driven by the same component, material placement locations can be determined more precisely compared with other methods currently in use. The foregoing methods and apparatus can be applied to a broad range of placement machines and head configurations.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A method of providing input to an inspection system for inspecting material laid by a material placement machine on a substrate to form a composite structure, the method comprising:
adding components to a servo-motor-driven add roller previously configured to feed fiber tows toward a compaction device of the machine while driving a first encoder output at an end of the add roller;
configuring the components to drive a second encoder output to signal completion by the material placement machine of a length of laid material equal to a frame height of image acquisition by the inspection system and to trigger image acquisition by the inspection system upon such completion while the material placement machine travels over the substrate; the inspection system configured to track a number of frames based on the second encoder output and to use the number of frames to locate images acquired by the inspection system.

2. The method of claim 1, wherein adding components to the servo-motor-driven add roller comprises removing a knob from one of the ends of the add roller.

3. The method of claim 1, wherein the first encoder output is used to track a length of material feed during movement of the material placement machine.

4. The method of claim 1, further comprising:
amplifying a signal from an encoder coupled to the add roller to obtain first and second amplified outputs; and
reducing a pulse rate of the second amplified output to obtain the second encoder output.

5. The method of claim 4, wherein reducing a pulse rate comprises dividing the second amplified output by an integer.

6. The method of claim 4, further comprising using the first amplified output to track a length of material feed during movement of the material placement machine.

7. The method of claim 1, further comprising:
coupling a first encoder to the add roller to provide the first encoder output; and
coupling a second encoder to the add roller to provide the second encoder output.

8. An inspection system for inspecting material laid by a material placement machine on a substrate to form a composite structure, the inspection system comprising:
a servo-motor-driven add roller that feeds fiber tows toward a compaction device of the machine and that drives first and second encoder outputs;
an encoder coupled to one end of the add roller, the encoder providing at least the first encoder output;
wherein the second encoder output is used to trigger image acquisition in a plurality of frames by the inspection system for inspecting material laid by the material placement machine while the material placement machine travels over the substrate, the second encoder output configured to signal completion by the placement machine of a linear distance of laid material equal to a length of the frames and to trigger image acquisition upon such completion;
the inspection system further configured to index and access the frames based on the completed linear distances.

9. The inspection system of claim 8, further comprising a second encoder coupled to the other end of the add roller to provide the second encoder output.

10. The inspection system of claim 8, wherein the encoder provides the first and second encoder outputs.

11. The inspection system of claim 8, further comprising:
an amplifier connected with the encoder to provide first and second amplified signals; and
a divider circuit that reduces a pulse rate of the second amplified signal to provide the second encoder output.

12. The inspection system of claim 8, wherein a width of the frames equals a width of a course of the laid material.

13. The inspection system of claim 8, wherein at least one of the encoder outputs is provided by an encoder coupled to an end of the add roller from which a knob has been removed.

14. The inspection system of claim 8, wherein the material placement machine comprises one selected from the following: a multi-head tape lamination machine (MHTLM), a contour tape lamination (CTL) machine, and a fiber placement (FP) machine.

15. The inspection system of claim 8, wherein the first encoder output is used to track a length of material feed during movement of the material placement machine.

16. An inspection system for inspecting material laid by a material placement machine on a substrate to form a composite structure, the inspection system comprising:
one or more cameras configured to acquire images of the laid material;
an encoder that provides at least a first encoder output to track a length of material feed while the material placement machine travels over the substrate; and
a servo-motor-driven add roller that feeds fiber tows toward a compaction device of the machine and that drives the encoder at one end of the add roller and drives a second encoder output, the second encoder output used for triggering image acquisition by the one or more cameras;
the second encoder output configured to trigger image acquisition upon completion by the machine of a linear distance of laid material equal to a frame included in a field of view of the one or more cameras, the inspection system configured to track the completed linear distances and to index acquired images in accordance with the tracked distances.

17. The inspection system of claim 16, further comprising a second encoder coupled to the roller and that provides the second encoder output.

18. The inspection system of claim 16, further comprising an amplifier that amplifies a signal from the encoder to provide the first and second encoder outputs.

19. The inspection system of claim 18, further comprising a divider circuit that reduces a pulse rate of the amplified signal to provide the second encoder output.

20. A method of providing input to an inspection system for inspecting material laid by a material placement machine on a substrate to form a composite structure, the machine including a servo-motor-driven add roller that feeds fiber tows toward a compaction device of the machine while driving a rotary encoder at a first end of the add roller, the rotary encoder configured to track material feed during movement of the placement machine, the method comprising:
retrofitting the servo-motor-driven add roller to drive an additional encoder output to trigger image acquisition by the inspection system for inspecting material laid by the material placement machine while the material placement machine travels over the substrate;
the retrofitting comprising coupling one or more components to at least one of the first end and a second end of the servo-motor-driven add roller;
the retrofitting further comprising timing the triggering by the additional encoder output so that a linear distance traveled by the machine between successive triggerings equals the length of a frame covered by a field of view of a camera of the inspection system, and configuring the inspection system to use the linear distances to store and locate acquired images.

21. The method of claim 20, the retrofitting comprising:
coupling a second encoder to the servo-motor-driven add roller at the second end of the add roller; and
interposing a divider circuit between the second encoder and the inspection system.

22. The method of claim 20, the retrofitting comprising:
adding an amplifier circuit to the rotary encoder to amplify the rotary encoder output; and
interposing a divider circuit between the amplifier circuit and the inspection system.

23. The method of claim 20, performed without replacing parts of the placement machine.

* * * * *